US008040888B1

(12) United States Patent
MacAdam et al.

(10) Patent No.: US 8,040,888 B1
(45) Date of Patent: Oct. 18, 2011

(54) PACKET SWITCH WITH PORT ROUTE TABLES

(75) Inventors: Angus David Starr MacAdam, Suwanee, GA (US); Brian Scott Darnell, Suwanee, GA (US)

(73) Assignee: Integrated Device Technology, Inc., San Jose, CA (US)

( * ) Notice: Subject to any disclaimer, the term of this patent is extended or adjusted under 35 U.S.C. 154(b) by 338 days.

(21) Appl. No.: 11/958,313

(22) Filed: Dec. 17, 2007

(51) Int. Cl.
*H04L 12/28* (2006.01)
(52) U.S. Cl. .......................... 370/392; 370/389; 370/400
(58) Field of Classification Search .................. 370/395, 370/392, 389, 352, 256, 400; 709/238
See application file for complete search history.

(56) References Cited

U.S. PATENT DOCUMENTS

| | | | |
|---|---|---|---|
| 5,999,537 A | 12/1999 | Tanabe et al. | |
| 6,032,190 A | 2/2000 | Bremer et al. | |
| 6,137,797 A * | 10/2000 | Bass et al. | 370/392 |
| 6,314,096 B1 | 11/2001 | Tanabe et al. | |
| 6,587,581 B1 * | 7/2003 | Matsuyama et al. | 382/149 |
| 6,618,372 B1 | 9/2003 | Tanabe et al. | |
| 6,956,854 B2 * | 10/2005 | Ganesh et al. | 370/392 |
| 6,985,438 B1 | 1/2006 | Tschudin | |
| 7,245,619 B1 | 7/2007 | Guan et al. | |
| 2005/0232269 A1 * | 10/2005 | Yao et al. | 370/389 |
| 2005/0276283 A1 * | 12/2005 | Gyselings et al. | 370/537 |
| 2006/0002385 A1 * | 1/2006 | Johnsen et al. | 370/389 |
| 2006/0039370 A1 * | 2/2006 | Rosen et al. | 370/389 |
| 2006/0146723 A1 * | 7/2006 | Navada et al. | 370/251 |
| 2006/0233224 A1 * | 10/2006 | Lotter et al. | 375/148 |
| 2006/0291483 A1 * | 12/2006 | Sela | 370/401 |
| 2007/0038840 A1 * | 2/2007 | Hummel et al. | 711/207 |
| 2007/0067591 A1 * | 3/2007 | Shiraki et al. | 711/163 |
| 2008/0034414 A1 * | 2/2008 | Mao et al. | 726/13 |
| 2008/0091766 A1 * | 4/2008 | Briscoe et al. | 709/202 |
| 2008/0151983 A1 * | 6/2008 | Reial | 375/228 |
| 2009/0067837 A1 * | 3/2009 | Hesse et al. | 398/51 |
| 2010/0157951 A1 * | 6/2010 | Hahm et al. | 370/335 |

* cited by examiner

*Primary Examiner* — Dang Ton
*Assistant Examiner* — Mandish Randhawa
(74) *Attorney, Agent, or Firm* — Kenneth Glass; Stanley J. Pawlik; Glass & Associates

(57) ABSTRACT

A packet switch includes individual route tables for ports of the packet switch. Each route table is associated with a port and individually maps a destination identifier of a data packet received at the port to another port in the packet switch. In some embodiments, the packet switch routes a data packet to an intermediate device based on a destination identifier in the data packet. The intermediate device services the data packet and sends the data packet, which includes the same destination identifier, back to the packet switch. In turn, the packet switch routes the data packet to a destination device based on the destination identifier in the data packet. The destination device terminates the data packet and may further service the data packet. In this way, the packet switch routes the data packet to both the intermediate device and the destination device based on the same destination identifier.

20 Claims, 9 Drawing Sheets

PACKET SWITCH WITH PORT ROUTE TABLES

BACKGROUND

A packet based communication system typically includes a packet switch for routing data packets from source devices to destination devices in the communication system. One type of packet switch routes a data packet received from a source device to a destination device by identifying the destination device from a route table based on a destination address in the data packet and then routing the data packet to the destination device. Moreover, the packet switch routes data packets having the same destination address to the same destination device. The destination device then processes the data packets.

In some types of communication systems, a packet switch receives a data packet and routes the data packet to a first destination device based on a destination address in the data packet and a route table. The first destination device processes data in the data packet, modifies the destination address in the data packet, and sends the data packet to the packet switch. The packet switch then routes the data packet to a second destination device based on the modified destination address in the data packet and the route table. The second destination device then further processes the data in the data packet. In these types of communication systems, it is often difficult to monitor data packet traffic through the packet switch and debug operation of the packet switch because the destination address of a data packet may not be the same each time the packet switch routes the data packet to a destination device.

In light of the above, a need exists for an improved system and method of routing data packets through a packet switch.

SUMMARY

In various embodiments, a packet switch includes individual route tables for ports of the packet switch. Each route table is associated with a port and individually maps a destination identifier of a data packet received at the port to another port in the packet switch. In this way, the packet switch may receive data packets having a same destination identifier at different input ports of the packet switch and route the data packets to different output ports of the packet switch based on the route tables of the input ports.

In some embodiments, the packet switch is configured to route a data packet to an intermediate device for preprocessing based on the destination identifier in the data packet and then routing the data packet to a destination device for further processing based on the same destination identifier. By preprocessing the data in the data packet, the intermediate device reduces overhead and increases processing capacity of the destination device, which increases processing capacity of a communication network containing the packet switch.

A packet switch, in accordance with one embodiment, includes a first port, a first route table associated with the first port, a second port coupled to the first port, a second route table associated with the second port, and a third port coupled to the second port. The first port receives a first data packet including a destination identifier and sends the first data packet to the second port based on the destination identifier and the first route table. The second port outputs the first data packet, receives a second data packet including the same destination identifier, and sends the second data packet to the third port based on the destination identifier and the second route table. The third port outputs the second data packet. In a further embodiment, the first data packet and the second data packet are the same data packet.

A system, in accordance with one embodiment, includes a packet switch, a first device, a second device, and a third device. The packet switch includes a first port coupled to the first device, a first route table associated with the first port, a second port coupled to the first port and the second device, a second route table associated with the second port, and a third port coupled to the second port and the third device. The first device sends a first data packet including a destination identifier to the first port. The first port sends the first data packet to the second port based on the destination identifier and the first route table. The second port outputs the first data packet to the second device. The second device sends a second data packet including the same destination identifier to the second port. Additionally, the second port sends the second data packet to the third port based on the destination identifier and the second route table. The third port outputs the second data packet to the third device. In a further embodiment, the first data packet and the second data packet are the same data packet.

A method of routing a data packet through a packet switch, in accordance with one embodiment includes receiving a first data packet including a destination identifier at a first port of a packet switch. The method further includes sending the first data packet to a second port of the packet switch based on the destination identifier and a first route table associated with the first port. Additionally, the method includes outputting the first data packet at the second port and receiving a second data packet including the same destination identifier at the second port. The method also includes sending the second data packet to a third port of the packet switch based on the destination identifier and a second route table associated with the second port. Further, the method includes outputting the second data packet at the third port. In a further embodiment, the first data packet and the second data packet are the same data packet.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings.

DETAILED DESCRIPTION

In various embodiments, a packet switch includes individual route tables for ports of the packet switch. The packet switch routes a data packet received at an input port of the packet switch to an output port of the packet switch based on the route table associated with the input port and a destination identifier in the data packet. In this way, the packet switch routes the data packet between ports of the packet switch based on both the input port receiving the data packet and the destination identifier in the data packet.

Figure 1:
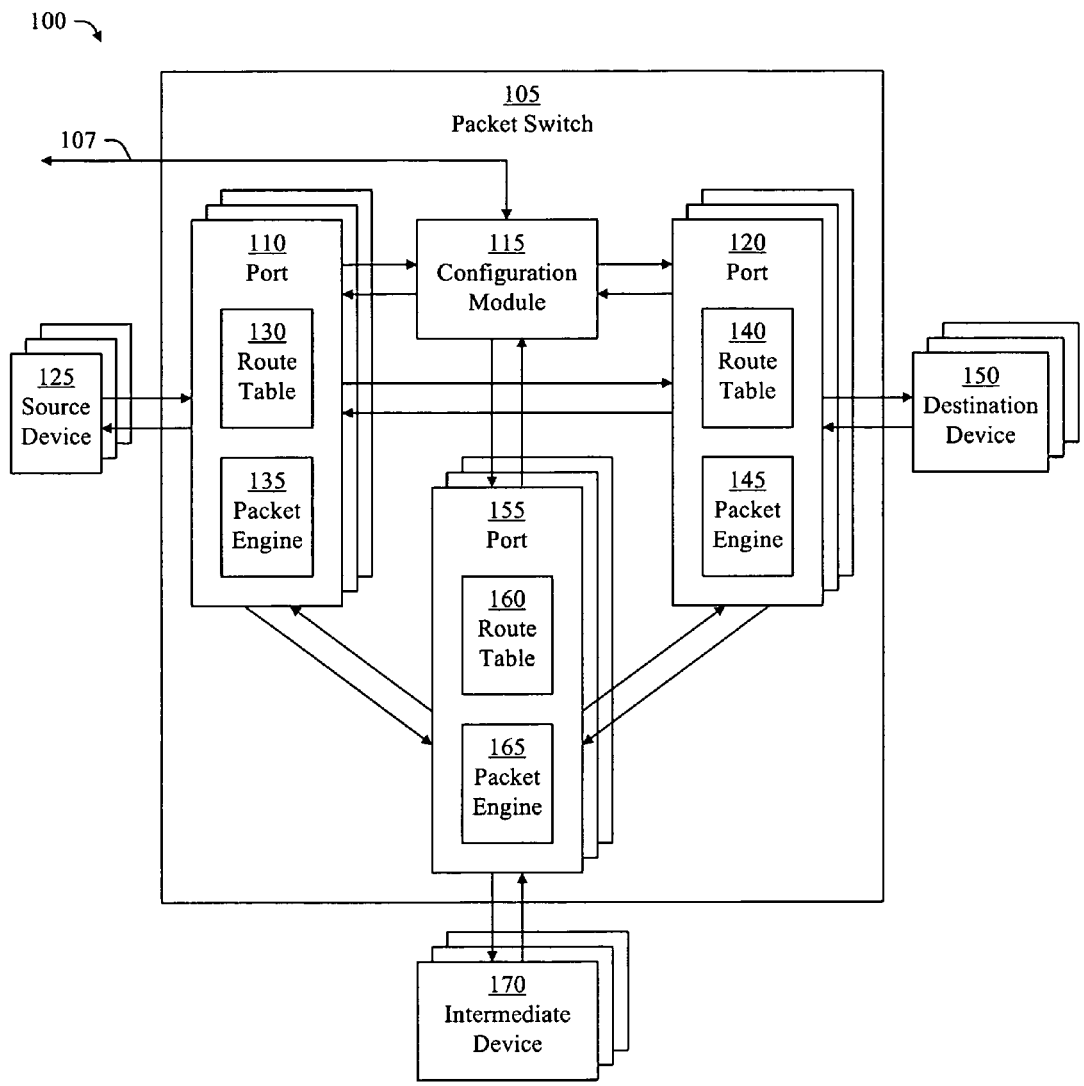
FIG. 1 is a block diagram of a communication system, in accordance with an embodiment of the present invention.

FIG. 1 illustrates a communication system 100, in accordance with an embodiment of the present invention. The communication system 100 includes a packet switch 105, source devices 125, destination devices 150, and intermediate devices 170. Each of the source devices 125 is coupled (e.g., connected) to the packet switch 105 and sends data packets to the packet switch 105. In various embodiments, one or more of the source devices 125 may also receive data packets from the packet switch 105. For example, one or more of the source devices 125 may be input-output devices. Each of the destination devices 150 is coupled (e.g., connected) to the packet switch 105 and receives data packets from the packet switch 105. In various embodiments, one or more of the destination devices 150 may also send data packets to the packet switch 105. For example, one or more of the destination devices 150 may be input-output devices. Each of the intermediate devices 170 is coupled (e.g., connected) to the packet switch 105 and receives data packets from the packet switch 105. Additionally, each of the intermediate devices 170 sends data packets to the packet switch 105. For example, the intermediate devices 170 may be input-output devices. In some embodiments, one or more of the source devices 125, destination devices 150, or intermediate devices 170 in the communication system 100 may be another packet switch 105.

The packet switch 105 includes a configuration module 115, ports 110 (e.g., input ports), ports 120 (e.g., output ports), and ports 155 (e.g., input-output ports). Each of the ports 110 is coupled (e.g., connected) to a corresponding source device 125 and the configuration module 115. Each of the ports 120 is coupled (e.g., connected) to a corresponding destination device 150 and the configuration module 115. Each of the ports 155 is coupled (e.g., connected) to a corresponding intermediate device 170 and the configuration module 115. Additionally, the ports 110 are selectively coupled (e.g., connected) to the ports 120 and the ports 155, and the ports 120 are selectively coupled (e.g., connected) to the ports 155.

In some embodiments, each of the ports 110 is coupled to each of the ports 120 and each of the ports 155, and each of the ports 120 is coupled to each of the ports 155. In various embodiments, the packet switch 105 may include any number of ports 110, any number of ports 120, and any number of ports 155. In further embodiments, each of the ports 110 are coupled (e.g., connected) to each other, each of the ports 120 are coupled (e.g., connected) to each other, and each of the ports 155 are coupled (e.g., connected) to each other. Moreover, each of the source devices 125 may function as a destination device 150 or an intermediate device 170, and each of the destination devices 150 may function as a source device 125 or an intermediate device 170.

In operation, a first device of the communication system 100 (e.g., a source device 125, a destination device 150, or an intermediate device 170) sends a data packet including a destination identifier to the port of the packet switch 105 (e.g., a port 110, a port 120, or a port 155) corresponding to the first device. The port receives the data, identifies a second port in the packet switch 105 based on the destination identifier, and sends the data packet to the second port. The second port receives the data packet and outputs the data packet from the packet switch 105 to a second device corresponding to the second port. The second device services (e.g., processes) the data packet, for example by accessing or modifying data in the data packet, storing the data packet, delaying the data packet, or some combination thereof. Additionally, the second device sends another data packet to the second port, which may be the same data packet received by the second device or a modified data packet having the same destination identifier as the data packet received by the second device. The second port receives the data packet from the second device, identifies a third port in the packet switch 105 based on the destination identifier in the data packet, and sends the data packet to the third port. In turn, the third port outputs the data packet to a third device corresponding to the third port and the third device terminates the data packet. In some embodiments, the third device further services (e.g., further processes) the data packet in addition to terminating the data packet, for example by accessing or modifying data in the data packet. In this way, the packet switch 105 routes data packets having a same destination identifier to different ports of the packet switch 105 based on the port of the packet switch 105 receiving the data packet. Moreover, the packet switch 105 may sequentially route a data packet to multiple devices coupled to the packet switch 105 without a need for modifying the destination identifier in the data packet.

In one embodiment, a source device 125 sends a data packet including a destination identifier to the port 110 corresponding to the source device 125. The port 110 identifies a port 155 based on the destination identifier and sends the data packet to the port 155. In turn, the port 155 sends the data packet to the intermediate device 170 corresponding to the port 155. The intermediate device 170 services (e.g., processes) the data packet by modifying a data payload of the data packet and sends the data packet to the port 155. The port 155 identifies a port 120 based on the destination identifier in the data packet sent from the intermediate device 170 and sends the data packet to the port 120. In turn, the port 120 sends the data packet received from the port 155 to the destination device 150 coupled to the port 120 and the destination device 150 terminates the data packet. In addition to terminating the data packet, the destination device 150 may further service (e.g., further process) the data packet, for example by accessing or modifying data in the data packet. In a further embodiment, the packet switch 105 may sequentially route (e.g., send) the data packet to multiple ports 155 for sequential servicing (e.g., sequential processing) by the intermediate devices 170 corresponding to the multiple ports 155 and then route (e.g., send) the data packet to the port 120 for further servicing (e.g., further processing) by the destination device 150 corresponding to the port 120.

In various embodiments, each of the ports 110 includes a route table 130 and a packet engine 135, each of the ports 120 includes a route table 140 and a packet engine 145, and each of the ports 155 includes a route table 160 and a packet engine 165. Each route table 130 of a port 110 maps destination identifiers to port identifiers individually for that port 110. In operation, the port 110 receives a data packet containing a destination identifier. In turn, the packet engine 135 identifies a port identifier from the route table 130 of the port 110 based on the destination identifier in the data packet. Further, the packet engine 135 sends the data packet to the port (e.g., a port 110, a port 120, or a port 155) identified by the port identifier. In other embodiments, each of the ports 110 is associated with a route table 130 and a packet engine 135 but the route table 130 or the packet engine 135, or both, are located externally of the port 110.

The route table 140 of a port 120 maps destination identifiers to port identifiers individually for that port 120. In operation, the port 120 receives a data packet containing a destination identifier. In turn, the packet engine 145 identifies a port identifier from the route table 140 of the port 120 and the destination identifier in the data packet. Further, the packet engine 145 sends the data packet to the port (e.g., a port 110, a port 120, or a port 155) identified by the port identifier. In other embodiments, each of the ports 120 is associated with a route table 140 and a packet engine 145 but the route table 140 or the packet engine 145, or both, are located externally of the port 120.

The route table 160 of a port 155 maps destination identifiers to port identifiers individually for that port 155. In operation, the port 155 receives a data packet containing a destination identifier. In turn, the packet engine 165 identifies a port identifier from the route table 160 of the port 155 and the destination identifier in the data packet. Further, the packet engine 165 sends the data packet to the port (e.g., a port 110, a port 120, or a port 155) identified by the port identifier. In other embodiments, each of the ports 155 is associated with a route table 160 and a packet engine 165 but the route table 160 or the packet engine 165, or both, are located externally of the port 155.

Each of the route tables in the packet switch 105 (e.g., the route tables 130, the route tables 140, and the route tables 160) may include any type of data structure, software, or hardware for storing port identifiers and retrieving port identifiers based on an index. For example, the route table may be a data memory, such as a random access memory (RAM), that stores port identifiers indexed by corresponding memory addresses of the data memory. Each of the packet engines in the packet switch 105 (e.g., the packet engines 135, the packet engines 145, and the packet engines 165) may include any type of hardware or software, such as a logic circuit, a processor, a microprocessor, a controller, a microcontroller, a computing code, firmware, or the like, or any combination thereof.

The configuration module 115 receives commands (e.g., maintenance commands) and configures the ports of the packet switch 105 (e.g., the ports 110, the ports 120, and the ports 155) based on the commands. In various embodiments, one or more of the ports of the packet switch 105 receive commands from one or more of the devices coupled to the packet switch 105 (e.g., the source devices 125, the destination devices 150, and the intermediate devices 170) and send the commands to the configuration module 115. In some embodiments, the configuration module 115 receives commands through an optional communication channel 107 instead of receiving the commands from one or more of the port of the packet switch 105. In other embodiments, configuration module 115 may receive commands through the communication channel 107 or ports of the packet switch 105, or both.

In some embodiments, the configuration module 115 configures the ports of the packet switch 105 (e.g., the ports 110, the ports 120, and the ports 155) by configuring the route tables in the packet switch 105 (e.g., the route tables 130, the route tables 140, and the route tables 160) based on commands received by the configuration module 115. In one embodiment, the configuration module 115 receives a write command (e.g., a local write command) including an index, a first port identifier, and a second port identifier. For example, the configuration module 115 may receive a data packet identifying a write operation and including the index, the first port identifier, and the second port identifier from a port of the packet switch 105 (e.g., a port 110, a port 120, or a port 155). The configuration module 115 identifies a port in the packet switch 105 based on the first port identifier and writes the second port identifier to the route table of the identified port at the index.

In another embodiment, the configuration module 115 receives the write command (e.g., the local write command), identifies a port in the packet switch 105 based on the first port identifier, and sends a command containing the index and the second port identifier to the packet engine of the identified port. For example, the configuration module 115 may send a data packet identifying a write operation, and including the index and the second port identifier, to the identified port. In turn, the packet engine 135 writes the second port identifier to the route table of the identified port at the index based on the command received from the configuration module 115.

In a further embodiment, the configuration module 115 receives a read command (e.g., a local read command) including an index and a first port identifier. For example, the configuration module 115 may receive a data packet identifying a read operation and including the index and the first port identifier. The configuration module 115 identifies a port in the packet switch 105 (e.g., a port 110, a port 120, or a port 155) based on the first port identifier and reads a second port identifier from the route table of the identified port at the index.

In another embodiment, the configuration module 115 receives the read command (e.g., the local read command) and identifies a port in the packet switch 105 (e.g., a port 110, a port 120, or a port 155) based on the first port identifier. Further, the configuration module 115 generates a data packet identifying a read operation and containing the index, and sends the data packet to the packet engine of the identified port (e.g., the packet engine 135, the packet engine 145, or the packet engine 165). In turn, the packet engine of the identified port reads the second port identifier from the route table of the identified port (e.g., the route table 130, the route table 140, or the route table 160) at the index, generates a data packet containing the second port identifier, and sends the data packet to the configuration module 115.

In further embodiments, the configuration module 115 identifies a source of a read command based on a source identifier in the read command and sends the second port identifier to the source of the read command. For example, the source of the read command may be a source device 125, and the configuration module 115 may generate a data packet containing the second port identifier and send the data packet to the source device 125 through a port (e.g., a port 110, a port 120, or a port 155) coupled to the source device 125.

In some embodiments, the configuration module 115 receives a write command (e.g., a global write command) including an index and a port identifier. For example, the configuration module 115 may receive a data packet identifying a write operation and including the index and the port identifier. The configuration module 115 writes the port identifier to each route table of the packet switch 105 (e.g., the route tables 130, the route tables 140, and the route tables 160) at the index. In one embodiment, the configuration module 115 writes the ports identifier to each of the route tables of the packet switch 105 substantially in parallel, for example by performing overlapping write operations.

In another embodiment, the configuration module 115 receives the write command (e.g., the global write command) and sends a command containing the index and the port identifier to each packet engine of the packet switch 105 (e.g., the packet engines 135, the packet engines 145, and the packet engines 165). For example, the configuration module 115 may broadcast a data packet indicating a write operation, and including the index and the port identifier, to each packet engine of the packet switch 105. In turn, the packet engine of each port in the packet switch 105 (e.g., the ports 110, the ports 120, and the ports 155) that receives the data packet writes the port identifier to the route table associated with the port (e.g., the route table 130, the route table 140, or the route table 160) at the index.

In a further embodiment, the configuration module 115 receives a read command (e.g., a global read command) including an index. For example, the configuration module 115 may receive a data packet identifying a read operation and including the index. The configuration module 115 reads a port identifier from a route table of a predetermined port in the packet switch 105 at the index. For example, the predetermined port may be one of the ports 110. The configuration module 115 reads the port identifier from the route table associated with the predetermined port for consistency reasons because the individual route tables in the packet switch 105 may be configured to have different port identifiers at the index. In this way, the route table in the predetermined port functions as a global route table for global read operations. For example, the route tables or portions of the route tables in the packet switch 105 may be configured by using global write commands and a port identifier stored at an index in each of the route tables may be determined by performing a global read command at the index.

In another embodiment, the configuration module 115 receives the read command (e.g., the global read command), generates a data packet identifying a read operation and containing the index, and sends the data packet to the predetermined port in the packet switch 105 (e.g., the port 110, the port 120, or the port 155). In turn, the packet engine of the predetermined port (e.g., the packet engine 135, the packet engine 145, or the packet engine 165) reads the port identifier from the route table associated with the predetermined port (e.g., the route table 130, the route table 140, or the route table 160) at the index, generates a data packet containing the port identifier, and sends the data packet to the configuration module 115.

In further embodiments, the configuration module 115 identifies a source of the read command based on a source identifier in the read command and sends the port identifier to the source of the read command. For example, the source of the read command may be a source device 125, and the configuration module 115 may generate a data packet containing the port identifier and send the data packet to the source device 125 through a port (e.g., a port 110, a port 120, or a port 155) coupled to the source device 125.

In one embodiment, the packet switch 105 conforms to a serial RapidIO™ standard. In this embodiment, the global write commands and global read commands conform to the serial RapidIO standard. For example, the global write commands and the global read commands may be data packets conforming to the serial RapidIO standard. Moreover, the route tables of the packet switch 105 (e.g., the route tables 130, the route tables 140, and the route tables 160) may be configured according to the serial RapidIO standard by using the global write commands and global read commands. Additionally, the packet switch 105 may be configured by using local write commands to individually configure each route table of the packet switch 105 such that each of the route tables maps a given destination identifier to the same port of the packet switch 105. In this way, the route tables collectively function as a global route table in accordance with the serial RapidIO standard.

In another embodiment, the packet switch 105 may be configured to conform to the serial RapidIO standard with respect to the ports 110 and the ports 120 by using local write commands to individually configure the route tables in the packet switch 105 (e.g., the route tables 130, the route tables 140, and the route tables 160). In this embodiment, the ports 110 and the ports 120 are defined as serial RapidIO ports. Further, the route tables 130 associated with the ports 110 are configured to map destination identifiers to corresponding ports 155 and the route tables 160 associated with the ports 155 are configured to map the destination identifiers to corresponding ports 120 coupled to destination devices 150. In this way, the packet switch 105 maps a data packet from a port 110 defined as a serial RapidIO port to a destination device 150 (e.g., a target device) coupled to a port 120 defined as a serial RapidIO port according to the serial RapidIO standard. Moreover, the packet switch 105 may route the data packet to one or more intermediate devices 170 through corresponding ports 155 before routing the data packet to the destination device 150.

In various embodiments, an intermediate device 170 may be any type of device for servicing (e.g., processing) a data packet, such as a processor, a coprocessor, a preprocessor, a signal processor, a logic circuit, or the like. For example, an intermediate device 170 may be a preprocessor for preprocessing data in a data packet, for example by modifying the format of the data in the data packet or the location of data in the data packet. By preprocessing the data in the data packet, the intermediate device 170 reduces overhead and increases processing capacity of one or more destination devices 150. As a result, processing capacity of the communication network 100 is increased.

In one embodiment, the packet switch 105 in combination with an intermediate device 170 functions to align time sensitive data at a destination device 150 based on data in the data packets. The intermediate device 170 determines a delay (e.g., a period) between a time the intermediate device 170 receives a data packet from a port 155 and a time the intermediate device 170 will send the data packet back to the port 155 to synchronize arrival of the data packets at the destination device 150. For example, a port 110 may receive data packets containing data of signal multipath components of a communication signal and send the data packets to a port 155. In turn, the port 155 outputs the data packets to the intermediate device 170. The intermediate device 170 determines a delay for each data packet and sends the data packets back to the port 155 based on the delays to align the data of the data packets in time. In this way, the intermediate device 170 services the data packets. The intermediate device 170 may determine the delays of the data packets, for example, by matching data symbols in the data of the data packets and sending data packets having matched data symbols to the port 155 at substantially the same time. In turn, the port 155 sends the data packets to a port 120 coupled to the destination device 150 and the port 120 outputs the data packets having the matched data symbols to the destination device 150 at substantially the same time. The destination device 150 receives the data packets substantially aligned in time based on the data in the data packets and terminates the data packets. Additionally, the destination device 150 may further service (e.g., further process) the data packets. For example, the destination device 150 may include a rake receiver that combines data symbols in the data packets received from the port 120 to generate a combined signal representing the communication signal. In some embodiments, the destination device 150 may also further align the data packets received from the port 120, for example by performing a finer alignment of the data packets than the alignment performed by the intermediate device 170.

In one embodiment, an intermediate device 170 synchronizes a data rate for data packets received by the intermediate device 170 from the corresponding port 155 with a data rate for data packets sent back to the port 155 from the intermediate device 170. In this embodiment, the intermediate device 170 includes a first-in-first-out (FIFO) buffer for storing data packets received by the intermediate device 170 from the port 155 at one data rate. Further, the intermediate device 170 reads the data packets from the FIFO buffer and sends the data packets back to the port 155 at another data rate. For example, the intermediate device 170 may receive data packets from the port 155 at a faster data rate (e.g., 10 Mbps) and send the data packets back to the port 155 at a slower data rate (e.g., 5 Mbps).

In one embodiment, an intermediate device 170 includes an interface to another component in the communication system 100, such as a field-programmable gate array (FPGA). The intermediate device 170 receives data packets from the port 155 corresponding to the intermediate device 170 and sends the data packets to the component through the interface. Additionally, the intermediate device 170 receives data packets from the component through the interface and sends the data packets to the port 155 corresponding to the intermediate device 170. In a further embodiment, the intermediate device 170 includes a FIFO buffer for storing data packets received from the port 155 corresponding to the intermediate device 170 before sending the data packets to the component. Moreover, the intermediate device 170 may include another FIFO buffer for storing data packets received from the component before sending the data packets to the port 155 corresponding to the intermediate device 170. In some embodiments, the packet switch 105 conforms to a serial RapidIO standard. In these embodiments, the intermediate device 170 may transfer data packets to the component of the communication system 100 through the interface without a need for the component or the interface to conform to the serial RapidIO standard.

Figure 2:
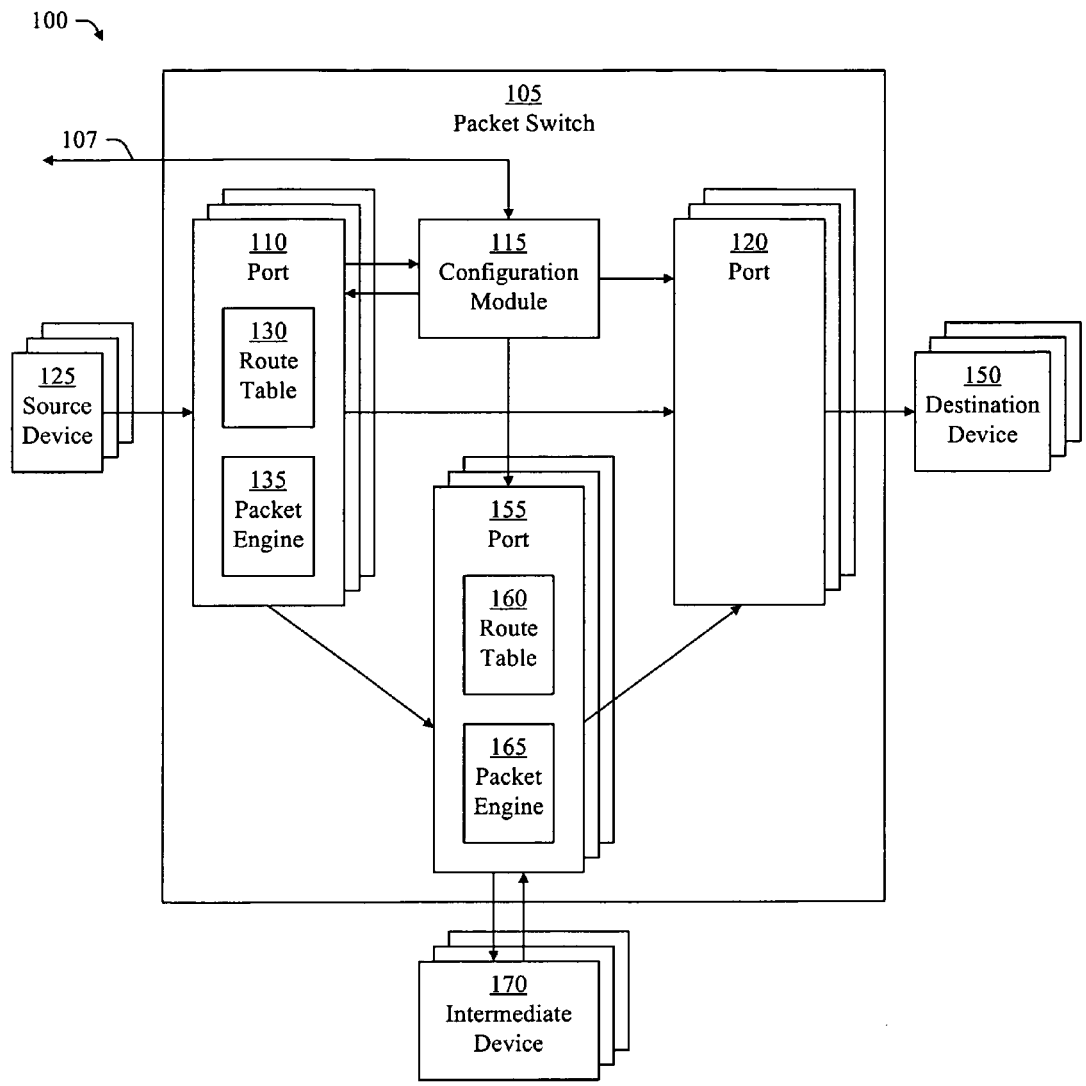
FIG. 2 is a block diagram of a communication system, in accordance with an embodiment of the present invention.

FIG. 2 illustrates the communication system 100, in accordance with an embodiment of the present invention. The communication system 100 includes the packet switch 105, the source devices 125, the destination devices 150, and the intermediate devices 170. Each of the source devices 125 is coupled (e.g., connected) to the packet switch 105 and sends data packets to the packet switch 105. For example, the source devices 125 may be input devices. Each of the destination devices 150 is coupled (e.g., connected) to the packet switch 105 and receives data packets from the packet switch 105. For example, the destination devices 150 may be output devices. Each of the intermediate devices 170 is coupled (e.g., connected) to the packet switch 105 and receives data packets from the packet switch 105. Additionally, each of the intermediate devices 170 sends data packets to the packet switch 105. For example, the intermediate devices 170 may be input-output devices.

The packet switch 105 includes the configuration module 115, the ports 110, the ports 120, and the ports 155. Each of the ports 110 is coupled (e.g., connected) to a corresponding source device 125 and receives data packets from the source device 125. Further, each of the ports 110 is coupled (e.g., connected) to one or more ports 155 and sends data packets to those ports 155. Each of the ports 155 is coupled (e.g., connected) to a corresponding intermediate device 170, outputs data packets to the intermediate device 170, and receives data packets from the intermediate device 170. Additionally, each of the ports 155 is coupled (e.g., connected) to one or more of the ports 120. Each of the ports 120 is coupled (e.g., connected) to a corresponding destination device 150 and outputs data packets to the destination device 150. In this embodiment, each port 110 is associated with a route table 130 and a packet engine 135, and each port 155 is associated with a route table 160 and a packet engine 165. For example, the port 110 may contain the route table 130 or the packet engine 135, or both, and the port 155 may contain the route table 160 or the packet engine 165, or both.

Additionally, the configuration module 115 is coupled (e.g., connected) to each of the ports 110, the ports 120, and the ports 155 for configuring the route tables 130 and the route tables 160. In various embodiments, one or more of the ports 110 receive commands from one or more of the source devices 125 coupled to the packet switch 105 and send the commands to the configuration module 115. For example, the commands may be data packets indicating operations to be performed on the route tables in the packet switch 105 (e.g., the route tables 130 and the route tables 160). In some embodiments, the configuration module 115 receives commands through an optional communication channel 107 instead of receiving the commands from one or more of the port 110. In other embodiments, the configuration module 115 may receive commands through the communication channel 107 or the ports 110, or both. In some embodiments, the packet switch 105 conforms to a serial RapidIO standard and operates on data packets conforming to the serial RapidIO standard.

In operation, a source device 125 sends a data packet (e.g., a first data packet) including a destination identifier to the port 110 coupled to the source device 125. In turn, the port 110 identifies a port 155 based on the destination identifier and sends the data packet to the port 155. The port 155 outputs the data packet to the intermediate device 170 coupled to the port 155. The intermediate device 170 services (e.g., processes) the data packet, for example by accessing or modifying data in the data packet. Further, the intermediate device 170 sends the data packet (e.g., a second data packet) including the destination identifier to the port 155. The port 155 receives the data packet sent by the intermediate device 170, identifies a port 120 based on the destination identifier in the data packet, and sends the data packet to a port 120. The port 120 receives the data packet sent by the port 155 and outputs the data packet to the destination device 150 coupled to the port 120. In this way, the packet switch 105 routes the data packet from the port 110 to port 155 and from the port 155 to the port 120 based on the same destination identifier. In some embodiments, the packet switch 105 may also sequentially route the data packet to multiple ports 155 before routing the data packet to the port 120, as is described more fully herein.

Figure 3:
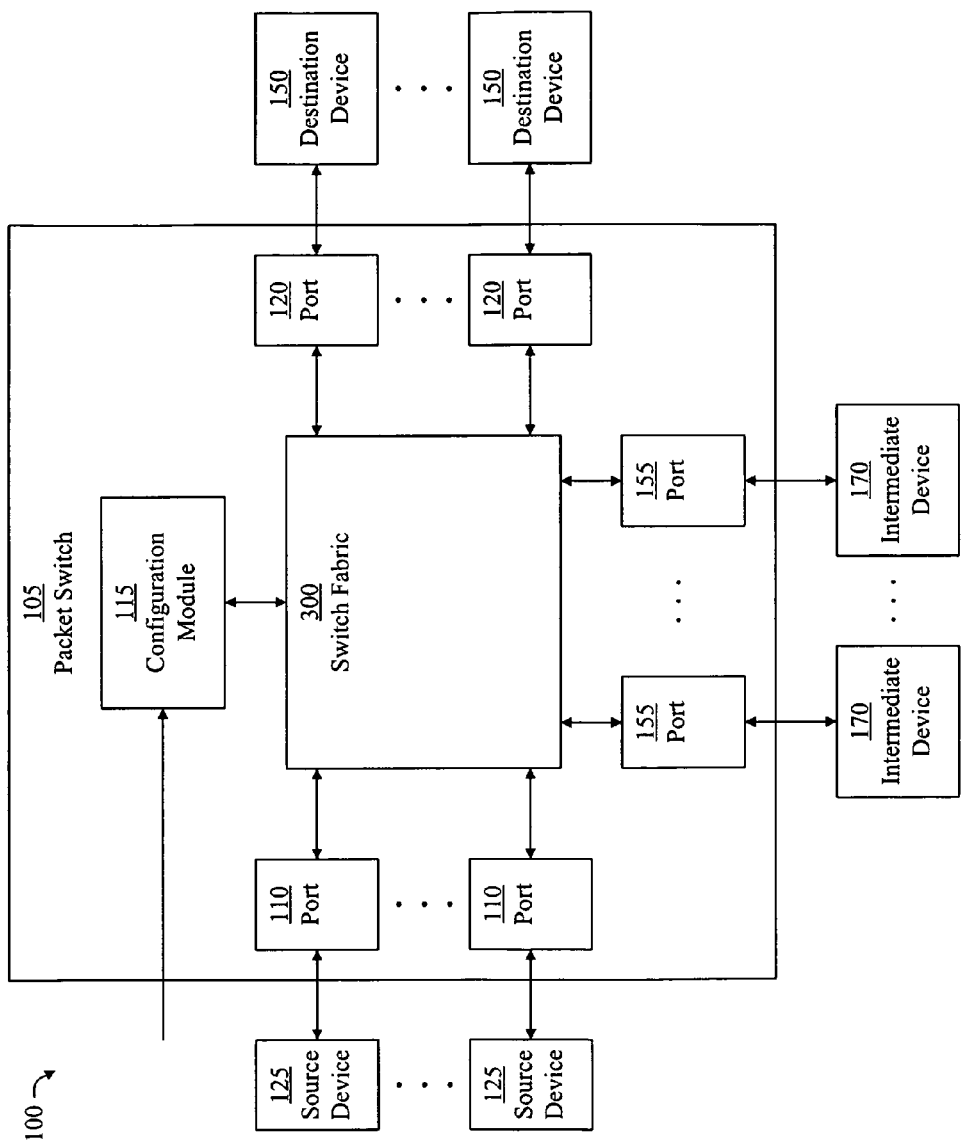
FIG. 3 is a block diagram of a communication system, in accordance with an embodiment of the present invention.

FIG. 3 illustrates the communication system 100, in accordance with an embodiment of the present invention. The communication system 100 includes the packet switch 105, the source devices 125, the destination devices 150, and the intermediate devices 170. Each of the source devices 125 is coupled (e.g., connected) to the packet switch 105 and sends data packets to the packet switch 105. In various embodiments, one or more of the source devices 125 may also receive data packets from the packet switch 105. For example, one or more of the source devices 125 may be input-output devices. Each of the destination devices 150 is coupled (e.g., connected) to the packet switch 105 and receives data packets from the packet switch 105. In various embodiments, one or more of the destination devices 150 may also send data packets to the packet switch 105. For example, one or more of the destination devices 150 may be input-output devices. Each of the intermediate devices 170 is coupled (e.g., connected) to the packet switch 105 and receives data packets from the packet switch 105. Additionally, each of the intermediate devices 170 send data packets to the packet switch 105. For example, the intermediate devices 170 may be input-output devices.

In this embodiment, the packet switch 105 includes a switch fabric 300 in addition to the configuration module 115, the ports 110, the ports 120, and the ports 155. Each of the ports 110 includes a route table 130 and a packet engine 135, and is coupled (e.g., connected) to a corresponding source device 125. Additionally, each of the ports 110 is coupled (e.g., connected) to the configuration module 115 and the switch fabric 300. Each of the ports 120 is coupled (e.g., connected) to a corresponding destination device 150 and optionally includes a route table 140 and a packet engine 145. Additionally, each of the ports 120 is coupled (e.g., connected) to the configuration module 115 and the switch fabric 300. Each of the ports 155 include a route table 160 and a packet engine 165, and is coupled (e.g., connected) to a corresponding intermediate device 170. Additionally, each of the ports 155 is coupled (e.g., connected) to the configuration module 115 and the switch fabric 300.

The ports in the packet switch 105 (e.g., the ports 110, the ports 120, and the ports 155) and the configuration module 115 communicate with each other by sending data packets through the switch fabric 300. In operation, the switch fabric 300 receives a data packet including a route identifier from a port in the packet switch 105 or the configuration module 115 and routes the data packet to a port in the packet switch 105 or the configuration module 115 based on the route identifier. In various embodiments, the route identifier in the data packet is a port identifier that identifies a port in the packet switch 105 or identifies the configuration module 115. For example, a default port identifier may identify the configuration module 115.

Figure 4:
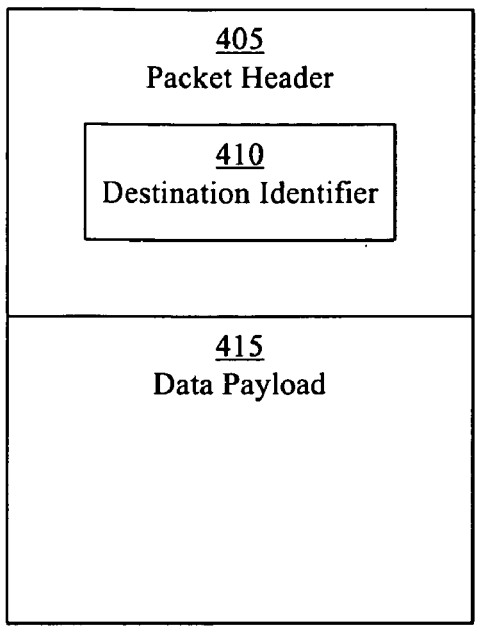
FIG. 4 is a block diagram of a data packet, in accordance with an embodiment of the present invention.

FIG. 4 illustrates a data packet 400, in accordance with an embodiment of the present invention. The data packet 400 includes a packet header 405 and a data payload 415. The packet header 405 includes a destination identifier 410 for routing the data packet 400 through the packet switch 105, as is described more fully herein. In various embodiments, an intermediate device 170 receives a data packet 400 from a port 155 corresponding to the intermediate device 170 and services the data packet 400 by storing the data packet, delaying the data packet, or accessing the data payload 415 in the data packet 400. The intermediate device 170 then sends the same data packet 400 back to the port 155. In other embodiments, the intermediate device 170 modifies the data payload 415 of the data packet 400 received from the port 155 and sends the modified data packet 400 back to the port 155. In these embodiments, the destination identifier 410 in the data packet 400 received by the intermediate device 170 is the same as the destination identifier 410 in the modified data packet 400. For example, the data packet 400 received by the intermediate device 170 from the port 155 and the modified data packet 400 sent back to the port 155 by the intermediate device 170 may have the same packet header 405.

Figure 5:
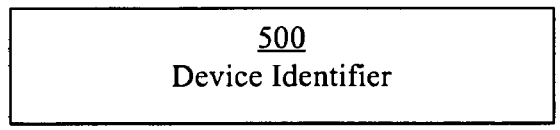
FIG. 5 is a block diagram of a destination identifier, in accordance with an embodiment of the present invention.

FIG. 5 illustrates the destination identifier 410, in accordance with an embodiment of the present invention. In this embodiment, the destination identifier 410 includes a device identifier 500 that identifies a device in the communication system 100 (e.g., a source device 125, a destination device 150, or an intermediate device 170). The route tables of the packet switch 105 (e.g., the route tables 130, the route tables 140, and the route tables 160) are configured to map the device identifier 500 to one or more port identifiers along a routing path through the packet switch 105. Moreover, at least one route table in the packet switch 105 maps the device identifier 500 to the port in the packet switch 105 (e.g., a port 110, a port 120, or a port 155) corresponding to the device identified by the device identifier 500 (e.g., a destination device 150).

Figure 6:
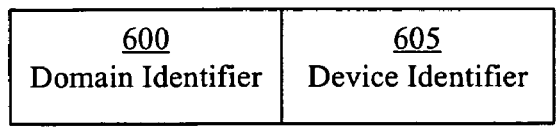
FIG. 6 is a block diagram of a destination identifier, in accordance with an embodiment of the present invention.

FIG. 6 illustrates the destination identifier 410, in accordance with an embodiment of the present invention. In this embodiment, the destination identifier 410 includes a domain identifier 600 for identifying a domain in the communication system 100 and a device identifier 605 for identifying a device in the domain (e.g., a source device 125, a destination device 150, or an intermediate device 170). In this embodiment, a port of the packet switch 105 (e.g., a port 110, a port 120, or a port 155) receives a data packet 400 including the destination identifier 410. In turn, the packet engine associated with the packet switch 105 (e.g., a packet engine 135, a packet engine 145, or a packet engine 165) selects the domain identifier 600 or the device identifier 605 in the destination identifier 410. Further, the packet engine identifies a port identifier based on the route table associated with the port and the selected identifier (e.g., the selected domain identifier 600 or the selected device identifier 605) and sends the data packet 400 to the port identified by the port identifier in the packet switch 105. In this way, a port of the packet switch 105 may be associated with a domain or a device in the communication system 100. In a further embodiment, a domain identifier 600 of a destination identifier 410 may identify a system coupled to a port of the packet switch 105 and the device identifier 605 may identify a device in that system.

Figure 7:
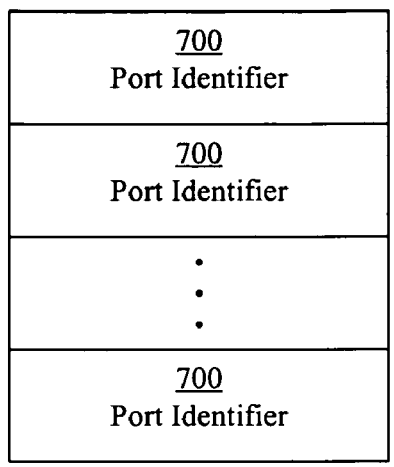
FIG. 7 is a block diagram of a route table, in accordance with an embodiment of the present invention.

FIG. 7 illustrates the route table 130, in accordance with an embodiment of the present invention. The route table 130 stores port identifiers 700 which are identified by corresponding indexes, such as a memory addresses. For example, the route table 130 may be a random-access memory (RAM) including locations indexed by memory addresses for storing the port identifiers 700. In other embodiments, the route table 130 may include any type of software, hardware, firmware, computing code, or the like, or any combination thereof, for storing port identifiers 700 identified by corresponding indexes. In various embodiments, each of the route tables 140 and 160 is similar to the route table 130 and contains port identifiers 700 identified by corresponding indexes. Moreover, the route tables 130, 140, and 160 may each store the same number of port identifiers 700 or may store different numbers of port identifiers 700.

Figure 8:
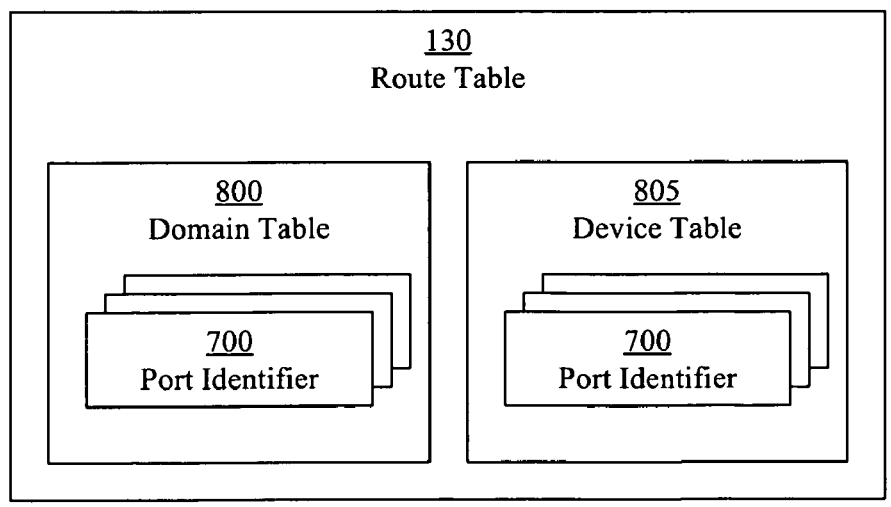
FIG. 8 is a block diagram of a route table, in accordance with an embodiment of the present invention.

FIG. 8 illustrates the route table 130, in accordance with an embodiment of the present invention. The route table 130 includes a domain table 800 and a device table 805. The domain table 800 and the device table 805 each store port identifiers 700 which are identified by corresponding indexes, such as memory addresses. For example, each of the domain table 800 and the device table 805 may be a random-access memory (RAM) including locations indexed by memory addresses for storing the port identifiers 700. The domain table 800 maps domain identifiers 600 to port identifiers 700 and the device table 805 maps device identifiers 605 to port identifiers 700. In one embodiment, the route table 130 is a random-access memory (RAM), the domain table 800 includes locations in a portion of the random access memory indexed by domain identifiers 600, and the device table 805 includes locations in the random access memory indexed by device identifiers 605.

Figure 9:
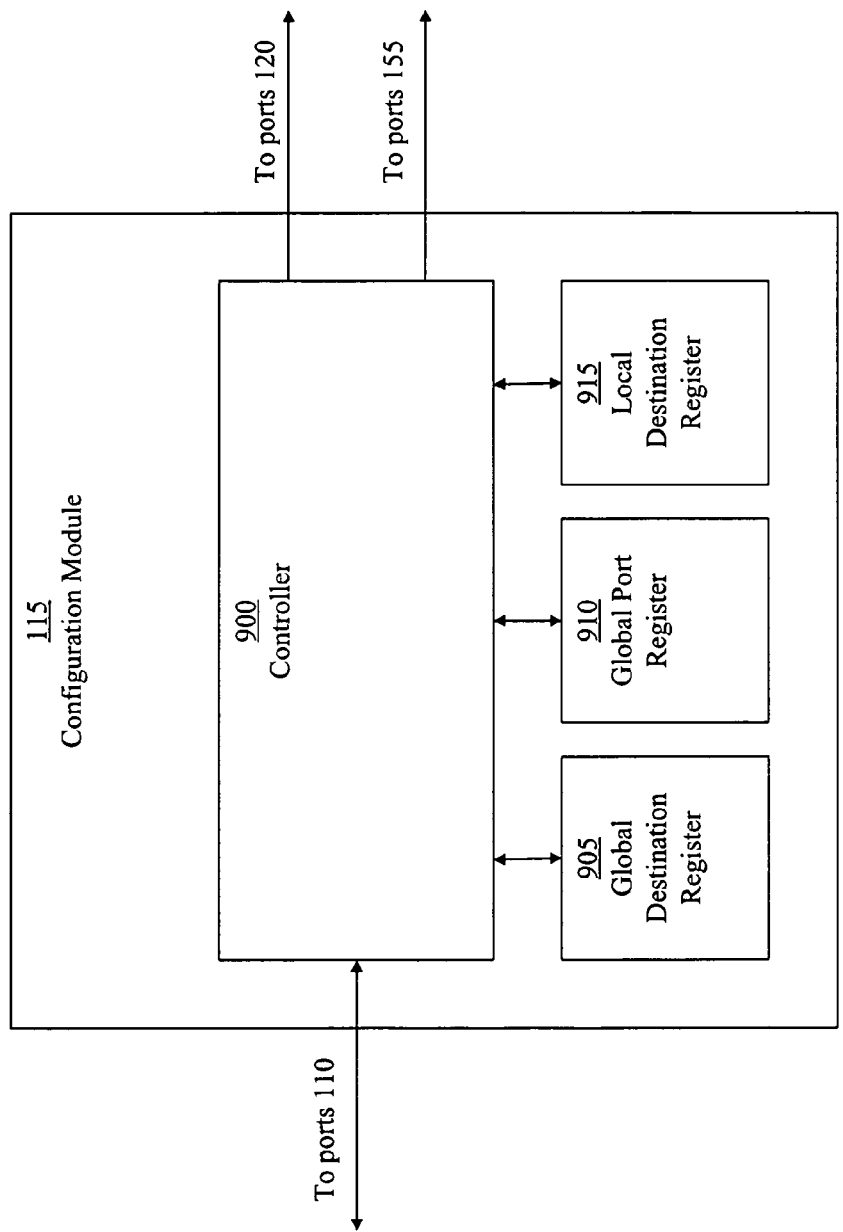
FIG. 9 is a block diagram of a configuration module, in accordance with an embodiment of the present invention.

FIG. 9 illustrates the configuration module 115, in accordance with an embodiment of the present invention. The configuration module 115 includes a controller 900, a global destination register 905, a global port register 910, and a local destination register 915. Each of the global destination register 905, the global port register 910, and the local destination register 915 is coupled (e.g., connected) to the controller 900. The controller 900 controls operation of the configuration module 115 based on commands received by the configuration module 115. In this process, the controller 900 writes data to, and reads data from, the registers in the configuration module 115 (e.g., the global destination register 905, the global port register 910, and the local destination register 915).

In one embodiment, the controller 900 writes a default value into the local destination register 915 upon a reset or restart of the packet switch 105. For example, the default value may be a value of zero. The default value in the local destination register 915 indicates that the configuration module 115 is to perform global updates on the route tables in the packet switch 105 (e.g., the route tables 130, the route tables 140, and the route tables 160). In some embodiments, the configuration module 115 receives a command including a port identifier 700 for updating the local destination register 915 and the controller 900 writes the port identifier 700 (e.g., a configuration value) into local destination register 915 based on the command. The configuration value in the local destination register 915 indicates the configuration module 115 is to perform a local update on a route table in the packet switch 105.

In operation, the configuration module 115 receives a command (e.g., a maintenance command) including a destination identifier 410 and a port identifier 700. The controller 900 writes the destination identifier 410 into the global destination register 905, reads the local destination register 915, and determines whether the local destination register 915 contains the default value or a configuration value. If the local destination register 915 contains the default value, the controller 900 writes the port identifier 700 of the command into the global port register 910. Further, the controller 900 updates the route tables in the packet switch 105 (e.g., the route tables 130, the route tables 140, and the route tables 160) by writing the port identifier 700 of the command to the route tables in the packet switch 105 at an index based on the destination identifier 410. For example, the index may be the destination identifier 410 or a portion of the destination identifier 410. In this way, the configuration module 115 performs a global update on the route tables in the packet switch 105.

If the controller 900 determines that the local destination register 915 contains a port identifier 700 (e.g., a configuration value), the controller 900 writes the port identifier 700 of the command into the global port register 910. Further, the controller 900 writes the port identifier 700 of the command to the route table, which is associated with the port identified by the port identifier 700 in the local destination register 915, at an index based on the destination identifier 410. For example, the index may be the destination identifier 410 or a portion of the destination identifier 410. In this way, the configuration module 115 performs a local update on the route table associated with the port identifier 700 in the local destination register 915.

In various embodiments, the controller 900 conforms to a serial RapidIO standard. In these embodiments, the global destination register 905 is a Standard Route Configuration Destination ID Select CSR register (STD_RTE_CONF_DESTID_SEL_CSR) having a configuration space byte offset of 0x070 as is defined by the serial RapidIO standard. The global port register 910 is a Standard Route Configuration Port Select register (STD_RTE_CONF_PORT_SEL_CSR) having a configuration space byte offset of 0x074 as defined by the serial RapidIO standard. Further, the local destination register 915 is a register in an extended features space in accordance with the serial RapidIO standard. For example, the local destination register 915 may have a configuration space byte offset of 0x1070.

Figure 10:
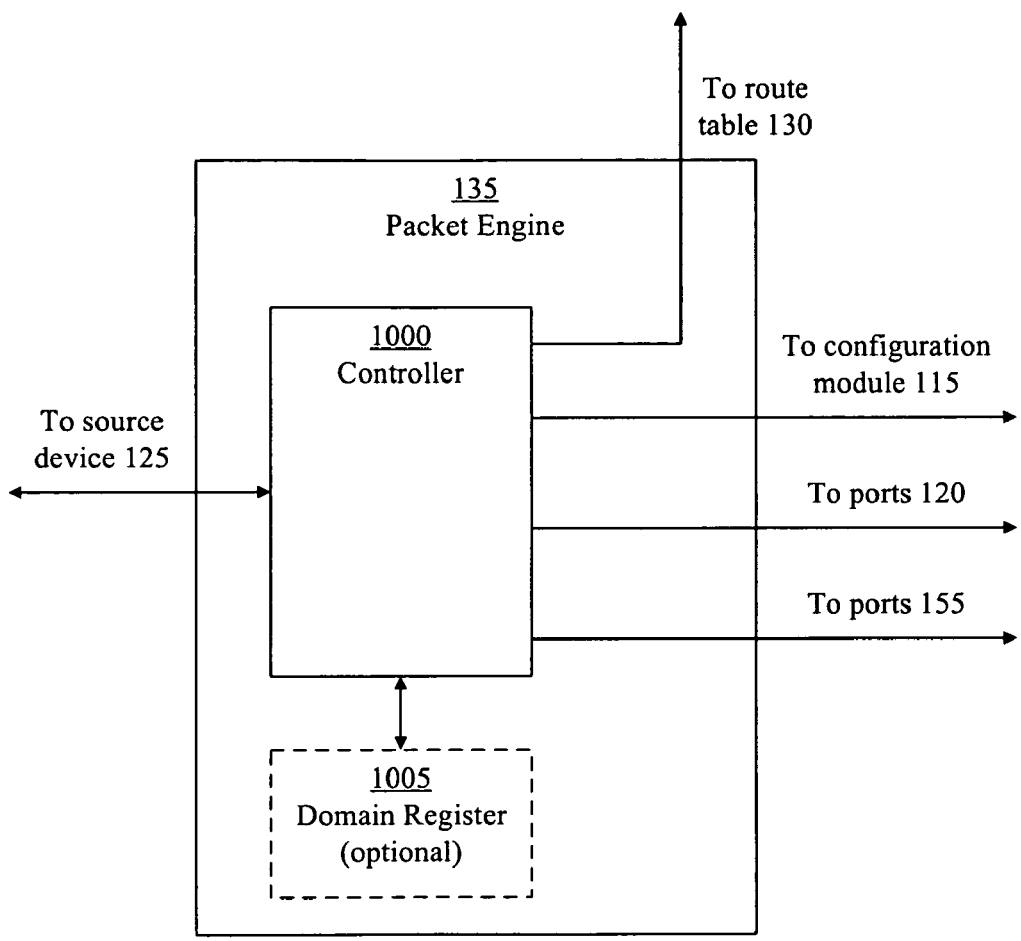
FIG. 10 is a block diagram of a packet engine, in accordance with an embodiment of the present invention.

FIG. 10 illustrates the packet engine 135, in accordance with an embodiment of the present invention. The packet engine 135 includes a controller 1000 and an optional domain register 1005. In embodiments including the domain register 1005, the controller 1000 is coupled (e.g., connected) to the domain register 1005. The controller 1000 controls operation of the packet engine 135. The domain register 1005 stores a domain associated with the port 110 containing the packet engine 135.

In operation, the packet engine 135 of a port 110 identifies a destination identifier 410 in a data packet 400 received by the port 110. Additionally, the packet engine 135 determines a port identifier 700 associated with the destination identifier 410 based on the route table 130 associated with the port 110 and the destination identifier 410. For example, the packet engine 135 may look up the port identifier 700 in the route table 130 by reading the port identifier 700 from the route table at an index based on the destination identifier 410.

In embodiments in which the destination identifier 410 includes a domain identifier 600 and a device identifier 605, the configuration module 115 may configure the domain register 1005 of the packet engine 135 to associate the port 110 with a domain. In one embodiment, the configuration module 115 configures the domain register 1005 by writing a domain identifier 600 into the domain register 1005. In another embodiment, the configuration module 115 sends a data packet 400 including a domain identifier 600 to the port 110 containing the packet engine 135 and the packet engine 135 writes the domain identifier 600 into the domain register 1005. In various embodiments, the configuration module 115 configures the domain register 1005 to store a default value upon a reset or a restart of the packet switch 105. For example, the default value may be a value of zero. In some embodiments, the configuration module 115 associated the packet switch with a domain by configuring each domain register 1005 to store the same domain identifier 600. In this way, the packet switch 105 is associated with the domain identified by the domain identifier 600.

In various embodiments, the port 110 receives a data packet 400 including a domain identifier 600 and a device identifier 605. For example, the domain identifier 600 may be a number of most significant bits of the destination identifier 410 and the device identifier 605 may be a number of least significant bits of the destination identifier 410. The packet engine 135 of the port 110 reads the domain register 1005 of the port 110 and determines whether the domain register 1005 contains the default value or a domain identifier 600 (e.g., a configuration value). If the domain register 1005 contains the default value, the packet engine 135 determines a port identifier 700 in the device table 805 based on the device identifier 605. For example, the packet engine 135 may read the port identifier 700 from the device table 805 at an index based on the device identifier 605. The packet engine 135 then sends the data packet 400 to the port identified by the port identifier 700 in the packet switch 105.

If the packet engine 135 instead determines that the domain register 1005 contains a domain identifier 600 (e.g., a configuration value), the packet engine 135 compares the domain identifier 600 in the domain register 1005 with the domain identifier 600 in the data packet 400. If the domain identifier 600 in the domain register 1005 matches the domain identifier 600 in the data packet 400, the packet engine 135 determines a port identifier 700 in the device table 805 based on the device identifier 605. For example, the packet engine 135 may read the port identifier 700 from the device table 805 at an index based on the device identifier 605. The packet engine 135 then sends the data packet 400 to the port of the packet switch 105 identified by the port identifier 700.

Otherwise, if the domain identifier 600 in the domain register 1005 does not match the domain identifier 600 in the data packet 400, the packet engine 135 determines a port identifier 700 in the domain table 800 based on the domain identifier 600. For example, the packet engine 135 may read the port identifier 700 from the domain table 800 at an index based on the domain identifier 600 in the data packet 400. The packet engine 135 then sends the data packet 400 to the port of the packet switch 105 identified by the port identifier 700, which functions as a gateway to the domain identified by the domain identifier 600.

In various embodiments, the packet engine 145 and the packet engine 165 have similar functions and structures as the packet engine 135 in the embodiment of FIG. 10. In contrast to the packet engine 135, the packet engine 145 includes a controller 1000 coupled to a destination device 150 instead of a source device 125 and coupled to a route table 140 instead of a route table 130. Additionally, the packet engine 145 is coupled to the ports 110 instead of the ports 120. Moreover, the packet engine 165 includes a controller 1000 coupled to an intermediate device 170 instead of a source device 125 and coupled to a route table 160 instead of a route table 130. Additionally, the packet engine 165 is coupled to the ports 110 instead of the ports 155. In one embodiment, each of the packet engines 135, the packet engines 145, and the packet engines 165 is coupled to the ports 110, the ports 120, and the ports 155 in the packet switch 105.

Figure 11:
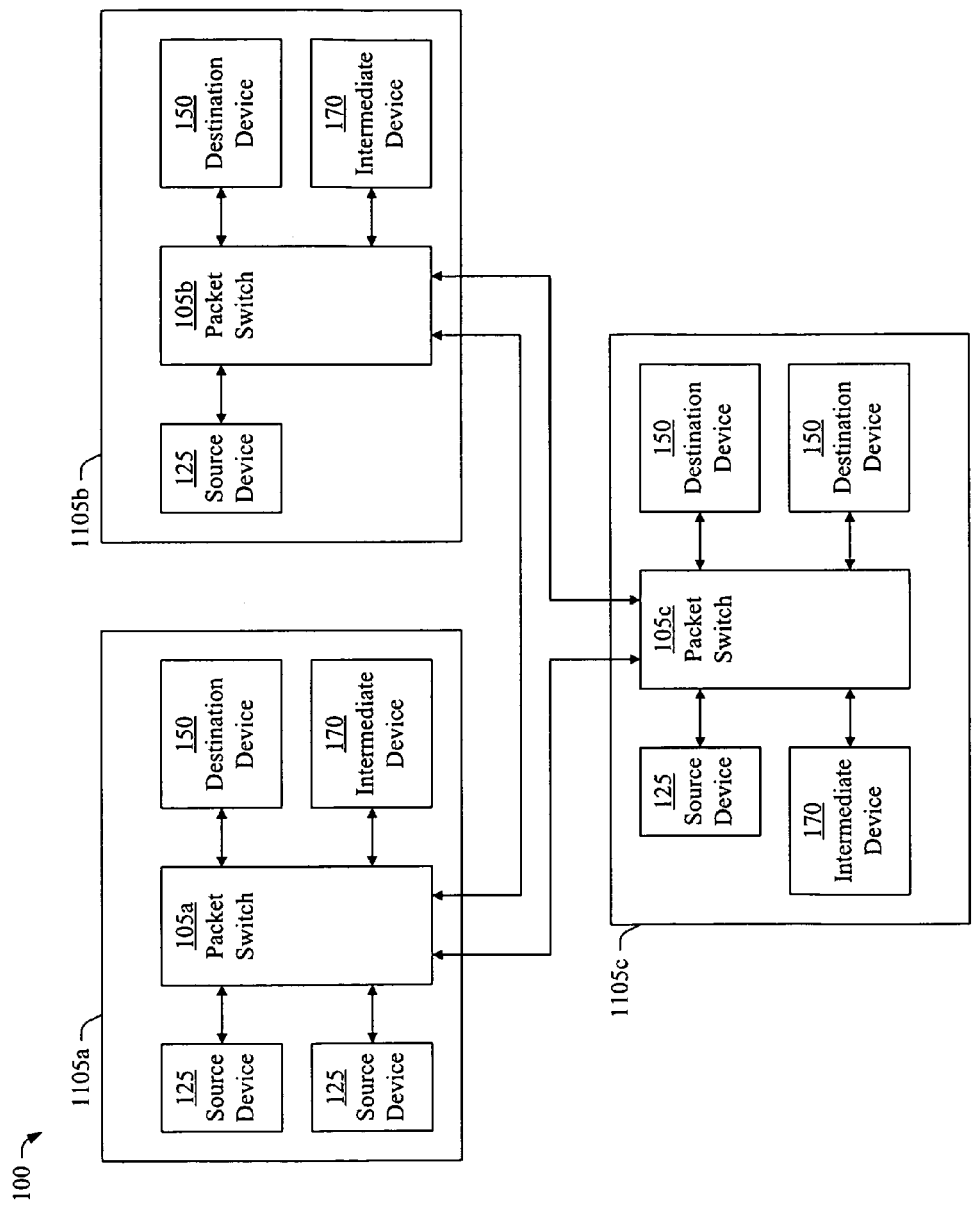
FIG. 11 is a block diagram of a communication system, in accordance with an embodiment of the present invention.

FIG. 11 illustrates a communication system 100 in accordance with an embodiment of the present invention. The communication system 100 includes domains 1105 (e.g., domains 1105a-c), each of which includes a packet switch 105 (e.g., a packet switch 105a, a packet switch 105b, or a packet switch 105c). Each of the domains 1105 is identified by a corresponding domain identifier 600 and includes at least one packet switch 105. As illustrated in FIG. 11, the domain 1105a includes the packet switch 105a, the domain 1105b includes the packet switch 105b, and the domain 1105c includes the packet switch 105c. Additionally, each of the domains 1105 includes one or more devices (e.g., source devices 125, destination devices 150, or intermediate devices 170) coupled to the packet switch 105 in the domain 1105. Each domain 1105 may represent an organization of components (e.g., packet switches 105, source devices 125, destination devices 150, or intermediate devices 170) in the communication system 100. For example, a domain 1105 may represent a structural, logical, or physical arrangement of components in the communication system 100. In various embodiments, a domain 1105 may represent a system, subsystem, or device in the communication system 100. For example, a domain 1105 may represent a packet switch 105 embodied in an integrated circuit and mounted on a circuit board.

In the embodiment of FIG. 11, the domain 1105a includes two source devices 125, a destination device 150, and an intermediate device 170, each of which is coupled to a port of the packet switch 105a in the domain 1105a. The domain 1105b includes a source device 125, a destination device 150, and an intermediate device 170, each of which is coupled to a port of the packet switch 105b in the domain 1105b. The domain 1105c includes a source device 125, two destination devices 150, and an intermediate device 170, each of which is coupled to a port of the packet switch 105c in the domain 1105c. In various embodiments, each of the domains 1105 may have any number of packet switches 105, any number of source devices 125, any number of destination devices 150, and any number of intermediate devices 170.

Each domain 1105 in the communication system 100 communicates with at least one other domain 1105 in the communication system 100. In various embodiments, a packet switch 105 in each domain 1105 is coupled (e.g., connected) to at least one packet switch 105 in another domain 1105 through one or more ports in each of the packet switches 105 (e.g., ports 110, ports 120, or ports 155). In the embodiment of FIG. 11, the packet switch 105a in the domain 1105a is coupled to the packet switch 105b in the domain 1105b and the packet switch 105c in the domain 1105c. Additionally, the packet switch 105b in the domain 1105b is coupled to the packet switch 105c in the domain 1105c. For example, a port 120 in the packet switch 105a may be coupled to a port 110 in the packet switch 105b and a port 120 in the packet switch 105b may be coupled to a port 110 in the packet switch 105a. Further, a port 155 in the packet switch 105a may be coupled to a port 110 in the packet switch 105c, a port 120 in the packet switch 105c may be coupled to the port 155 in the packet switch 105a, a port 155 in the packet switch 105b may be coupled to a port 110 in the packet switch 105c, and a port 120 in the packet switch 105c may be coupled to the port 155 in the packet switch 105b.

In operation, a port in a packet switch 105 of the communication system 100 (e.g., a port 110, a port 120, or a port 155) receives a data packet 400 including a domain identifier 600 and a device identifier 605. In turn, the packet engine in the port (e.g., a packet engine 135, a packet engine 145, or a packet engine 165) determines whether the domain identifier 600 in the data packet 400 identifies the domain 1105 containing the packet switch 105. For example, the packet engine may determine the domain identifier 600 in the data packet 400 identifies the domain 1105 containing the packet switch 105 by determining the domain identifier 600 in the data packet 400 matches the domain identifier 600 in the domain register 1005 of the port. If the domain identifier 600 in the data packet 400 identifies the domain 1105 containing the packet switch 105, the port identifies a port identifier 700 in the device table 805 associated with the port based on the device identifier 605 in the data packet 400 and sends the data packet 400 to the port identified by the port identifier 700 (e.g., a port 110, a port 120, or a port 155). In turn, the port identified by the port identifier 700 sends the data packet 400 to a device (e.g., a source device 125, a destination device 150, or an intermediate device 170) coupled to that port, or another packet switch 105 coupled to that port, in the domain 1105.

Otherwise, if the domain identifier 600 in the data packet 400 does not identify the domain 1105 containing the packet switch 105, the port identifies a port identifier 700 in the domain table 800 associated with the port based on the domain identifier 600 in the data packet 400 and sends the data packet 400 to the port identified by the port identifier 700 in the packet switch 105 (e.g., a port 110, a port 120, or a port 155). In turn, the port identified by the port identifier 700 sends the data packet 400 to a packet switch 105 in the domain 1105 identified by the domain identifier 600. Further, the packet switch 105 in the domain 1105 identified by the domain identifier 600 routes the data packet 400 to a device in the domain 1105, or another packet switch 105 in the domain 1105, based on the device identifier 605 in the data packet 400. For example, a port 120 of the packet switch 105a in the domain 1105a may send the data packet 400 to a port 110 of the packet switch 105b in the domain 1105b, and the packet switch 105b may route the data packet to a device (e.g., a source device 125, a destination device 150, or an intermediate device 170) in the domain 1105b.

Figure 12:
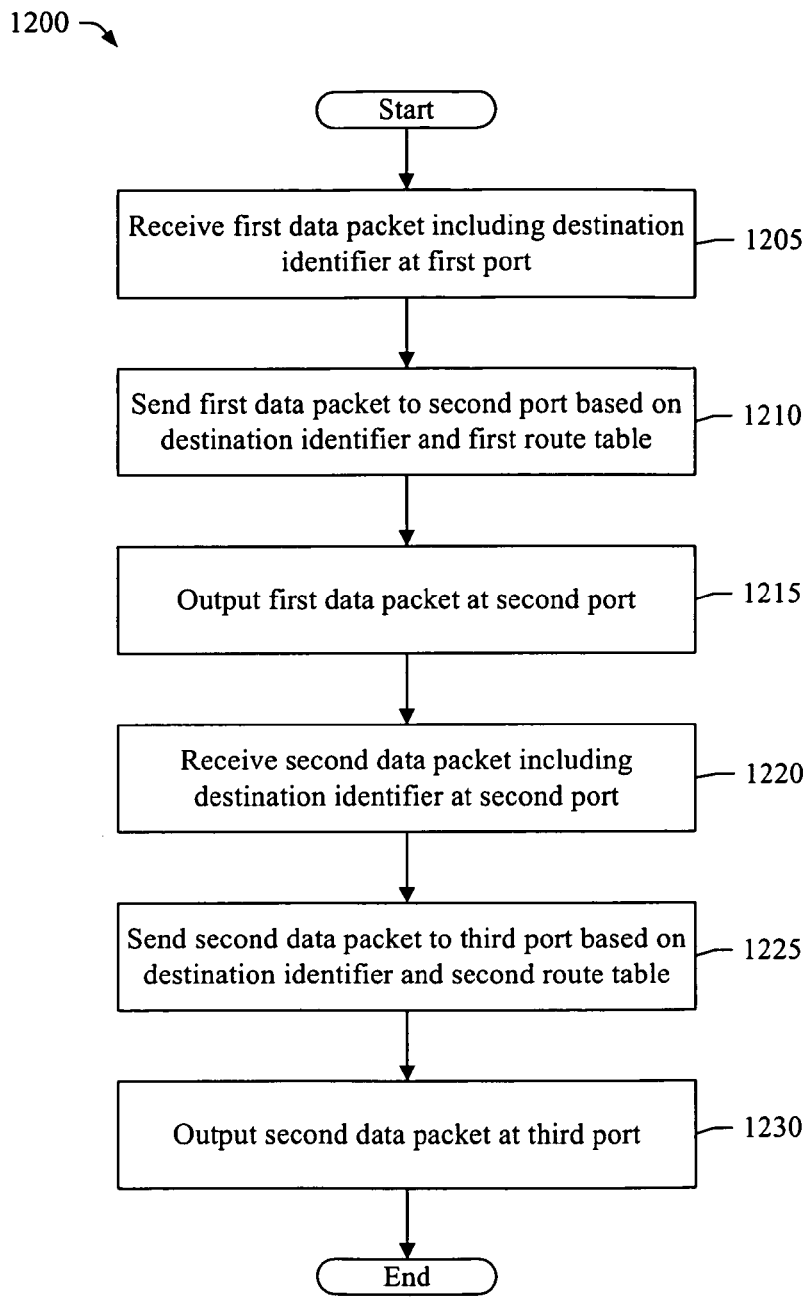
FIG. 12 is a flow chart of a method for routing a data packet through a packet switch, in accordance with an embodiment of the present invention.

FIG. 12 illustrates a method 1200 for routing a data packet through a packet switch, in accordance with an embodiment of the present invention. In step 1205, a first data packet including a destination identifier is received at a first port of a packet switch. In one embodiment, the packet switch 105 receives a data packet 400 including a destination identifier 410 at a port 110 (e.g., a first port) of the packet switch 105. The method 1200 then proceeds to step 1210.

In step 1210, the first data packet is sent to a second port of the packet switch based on the destination identifier and a first route table. In one embodiment, the packet engine 135 in the port 110 (e.g., the first port) determines a port identifier 700 of a port 155 (e.g., a second port) in the packet switch 105 based on the destination identifier 410 and the route table 130 (e.g., a first route table) associated with the port 110. In some embodiments, the destination identifier 410 includes a domain identifier 600 and a device identifier 605. In these embodiments, the packet engine 135 determines if the domain identifier 600 in the data packet 400 is a local domain by comparing the domain identifier 600 in the destination identifier 410 with a value in the domain register 1005 in the packet engine 135. If the packet engine 135 determines the domain identifier 600 of the data packet 400 identifies a local domain (e.g., a domain 1105 containing the packet engine 135), the packet engine 135 determines the port identifier 700 based on the device identifier 605 in the data packet 400 and the route table 130 associated with the port 110 (e.g., the first port). Further, the packet engine 135 sends the data packet 400 (e.g., the first data packet) to the port 155 identified by the port identifier 170. Otherwise, if the packet engine 135 determines the domain identifier 600 of the data packet 400 does not identify a local domain, the packet engine 135 determines the port identifier 700 based on the domain identifier 600 in the data packet 400 and the route table 130 associated with the port 110. Further, the packet engine 135 sends the data packet 400 (e.g., the first data packet) to the port 155 identified by the port identifier 700, which functions as a gateway to a packet switch 105 in the domain 1105 identified by the domain identifier 600. The method 1200 then proceeds to step 1215.

In step 1215, the first data packet is output at the second port. In one embodiment, the port 155 (e.g., the second port) outputs the data packet 400 (e.g., the first data packet) from the packet switch 105 to the intermediate device 170 corresponding to the port 155. The intermediate device 170 corresponding to the port 155 services (e.g., processes) the data packet 400, for example by reading or modifying data in the data payload 415 of the data packet 400, and sends a data packet 400 (e.g., a second data packet) including the destination identifier 410 back to the port 155. For example, the intermediate device 170 may send the data packet 400 received from the port 155 (e.g., the first data packet) back to the port 155. As another example, the intermediate device 170 may modify the data payload 415 in the data packet 400 received from the port 155 (e.g., the first data packet) and send the modified data packet 400 (e.g., the second data packet) back to the port 155. The method 1200 then proceeds to step 1220.

In step 1220, a second data packet including the destination identifier is received at the second port. In one embodiment, the port 155 receives the data packet 400 sent from the intermediate device 170 (e.g., the second data packet), which includes the destination identifier 410. The data packet 400 received by the port 155 from the intermediate device 170 (e.g., the second data packet) may be the same data packet 400 previously sent from the port 155 to the intermediate device 170 (e.g., the first data packet) or may have the same packet header 405 as the data packet 400 previously sent from the port 155 to the intermediate device 170 (e.g., the first data packet). The method 1200 then proceeds to step 1225.

In step 1225, the second data packet is sent to a third port of the packet switch based on the destination identifier and a second route table. In one embodiment, the port 155 (e.g., the second port) in the packet switch 105 identifies a port 120 (e.g., a third port) in the packet switch 105 based on the destination identifier 410 and the route table 140 (e.g., a second route table) associated with the port 155. Further, the packet engine 165 in the port 155 sends the data packet 400 (e.g., the second data packet) to the port 120. The method 1200 then proceeds to step 1230.

In step 1230, the second data packet is output at the third port. In one embodiment, the port 120 (e.g., the third port) outputs the data packet 400 received from the port 155 (e.g., the second data packet) from the packet switch 105 to the destination device 150 corresponding to the port 120. The destination device 150 then further services (e.g., further processes) the data packet 400. The method 1200 then ends.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A packet switch comprising:
 a first port configured to receive a first data packet comprising a destination identifier;
 a first route table associated with the first port;
 a second port coupled to the first port, the first port further configured to send the first data packet to the second port based on the destination identifier and the first route table, the second port configured to output the first data packet for preprocessing and receive a second data packet comprising the same destination identifier in response to outputting the first data packet;
 a second route table associated with the second port; and
 a third port coupled to the second port, the second port further configured to send the second data packet to the third port based on the destination identifier and the second route table, wherein the third port and the second port are not the same port, the third port configured to output the second data packet.

2. The packet switch of claim 1, wherein the packet switch is associated with a local domain, the destination identifier comprises a domain identifier for identifying a destination domain of the first data packet and a device identifier for identifying a destination device of the first data packet, the destination domain including at least one packet switch and a plurality of destination devices coupled to the at least one packet switch, the first route table comprises a first domain table and a first device table, and the second route table comprises a second domain table and a second device table, and wherein the first port is further configured to determine based on the domain identifier whether the local domain is the destination domain, identify a port identifier of the second port in the first domain table based on the domain identifier if the destination domain is not the local domain, identify the port identifier of the second port in the first device table based on the device identifier if the destination domain is the local domain, and send the first data packet to the second port based on the port identifier of the second port.

3. The packet switch of claim 1, further comprising a switch fabric coupled to the first port, the second port, and the third port, the switch fabric configured to route the first data packet from the first port to the second port and route the second data packet from the second port to the third port.

4. The packet switch of claim 1, wherein the first data packet and the second data packet are the same data packet.

5. The packet switch of claim 4, further comprising a switch fabric and a plurality of additional ports, each port of the plurality of additional ports coupled to a corresponding device of a plurality of devices, wherein the switch fabric is configured to sequentially route the first data packet to each port of the plurality of additional ports for preprocessing of the first data packet sequentially by each device of the plurality of devices before the third port outputs the second data packet.

6. A system, comprising:
 a packet switch comprising:
  a first port configured to receive a first data packet comprising a destination identifier;
  a first route table associated with the first port;
  a second port coupled to the first port, the first port further configured to send the first data packet to the second port based on the destination identifier and the first route table;
  a second route table associated with the second port; and
  a third port coupled to the second port, the second port further configured to send a second data packet to the third port based on the destination identifier and the second route table; and
 an intermediate device coupled to the second port, the second port configured to output the first data packet to the intermediate device, the intermediate device configured to generate the second data packet comprising the destination identifier by preprocessing the first data packet and to send the second data packet comprising the same destination identifier to the second port, the second port further configured to send the second data packet to the third port based on the destination identifier and the second route table, wherein the third port and the second port are not the same port, the third port configured to output the second data packet.

7. The system of claim 6, wherein the packet switch is associated with a local domain, the destination identifier comprises a domain identifier for identifying a destination domain of the first data packet and a device identifier for identifying a destination device of the first data packet, the destination domain including at least one packet switch and a plurality of destination devices coupled to the at least one packet switch, the first route table comprises a first domain table and a first device table, and the second route table comprises a second domain table and a second device table, and wherein the first port is further configured to determine based on the domain identifier whether the local domain is the destination domain, identify a port identifier of the second port in the first domain table based on the domain identifier if the destination domain is not the local domain, identify the port identifier of the second port in the first device table based on the device identifier if the destination domain is the local domain, and send the first data packet to the second port based on the port identifier of the second port.

8. The system of claim 6, wherein the first data packet and the second data packet are the same data packet.

9. The system of claim 6, wherein the third port outputs the second data packet to a destination device, and the intermediate device is further configured to preprocess the first data packet by determining a delay period between a time the intermediate device receives the first data packet output from the second port and a time the intermediate device sends the first data packet to the second port, for synchronizing arrival of the second data packet at the destination device.

10. The system of claim 6, wherein the intermediate device receives a first plurality of data packets from the second port, generates a second plurality of data packets by preprocessing the first plurality of data packet to determine a delay period for each data packet of the second plurality of data packets, and sends each data packet of the second plurality of data packets to the second port based on the delay period of the data packet to substantially align the data packets of the second plurality of data packets in time at the second port.

11. The system of claim 10, wherein each data packet of the first plurality of data packets includes data for a signal multipath component of a communication signal.

12. The system of claim 11, wherein the third port is further configured to output the second plurality of data packets to a destination device including a rake receiver configured to generate a combined signal representing the communication signal by combining data symbols in the second plurality of data packets.

13. The system of claim 10, wherein the intermediate device is further configured to match data symbols in data packets of the first plurality of data packets and to send the data packets to the second port at substantially the same time.

14. The system of claim 13, wherein the second port is further configured to send the data packets to the third port, and the third port is further configured to output the data packets to a destination device at substantially the same time.

15. The system of claim 10, wherein the third port is further configured to output the second plurality of data packets to a destination device, the destination device is configured to align the data packets of the second plurality of data packets in time by improving the alignment of the second plurality of data packets over the substantial alignment of the second plurality of data packets performed by the intermediate device.

16. The system of claim 6, wherein the packet switch further comprises a switch fabric and a plurality of additional ports, each port of the plurality of additional ports coupled to a corresponding device of a plurality of devices, wherein the switch fabric is configured to sequentially route the first data packet to each port of the plurality of additional ports for preprocessing of the first data packet sequentially by each device of the plurality devices before the third port outputs the second data packet.

17. A method of routing a data packet through a packet switch, the method comprising:
 receiving a first data packet comprising a destination identifier at a first port of a packet switch;
 sending the first data packet to a second port of the packet switch based on the destination identifier and a first route table associated with the first port;
 outputting the first data packet from the second port for preprocessing;

receiving a second data packet comprising the same destination identifier at the second port in response to outputting the first data packet;

sending the second data packet to a third port of the packet switch based on the destination identifier and a second route table associated with the second port, wherein the third port and the second port are not the same port; and outputting the second data packet from the third port.

18. The method of claim 17, wherein the first data packet and the second data packet are the same data packet.

19. The method of claim 17, wherein the packet switch is associated with a local domain, the destination identifier comprises a domain identifier for identifying a destination domain of the first packet switch and a device identifier for identifying a destination device of the first packet switch, the destination domain including at least one packet switch and a plurality of destination devices coupled to the at least one packet switch, the first route table comprises a first domain table and a first device table, and sending the first data packet to the second port comprises:

determining whether the destination domain is the local domain based on the domain identifier;

identifying a port identifier of the second port in the first second domain table based on the destination identifier if the domain is not the local domain;

identifying the port identifier of the second port in the first second device table based on the destination identifier if the domain is the local domain; and sending the first data packet to the second port based on the port identifier of the second port.

20. The method of claim 17, wherein the packet switch further comprises a switch fabric and a plurality of additional ports, each port of the plurality of additional ports coupled to a corresponding device of a plurality of devices, the method further comprising sequentially routing the first data packet to each port of the plurality of additional ports for preprocessing of the first data packet sequentially by each device of the plurality devices before outputting the second data packet from the third port.

* * * * *